United States Patent [19]

Yang

[11] Patent Number: 5,270,829
[45] Date of Patent: Dec. 14, 1993

[54] AUTOMATICALLY RESERVE-RECORDING AND RESERVE-PLAYING BACK A BROADCASTED PROGRAM

[75] Inventor: Yeong J. Yang, Haeundae, Rep. of Korea

[73] Assignee: Gold Star Co., Ltd., Seoul, Rep. of Korea

[21] Appl. No.: 717,883

[22] Filed: May 31, 1991

[30] Foreign Application Priority Data

May 31, 1990 [KR] Rep. of Korea ............................. 8035

[51] Int. Cl.⁵ .............................................. H04N 5/76
[52] U.S. Cl. .................................... 358/335; 360/33.1
[58] Field of Search .................. 358/335, 191.1, 194.1, 358/342; 360/33.1, 32

[56] References Cited

U.S. PATENT DOCUMENTS

| | | | |
|---|---|---|---|
| 3,697,015 | 10/1972 | Iwata | 360/74.3 |
| 4,368,988 | 1/1983 | Tahara et al. | 360/32 |
| 4,475,153 | 10/1984 | Kihara et al. | 358/335 |
| 4,631,601 | 12/1986 | Brugliera et al. | 360/33.1 |
| 4,706,121 | 11/1987 | Young | 358/335 |
| 4,873,584 | 10/1989 | Hashimoto | 358/335 |
| 5,047,867 | 9/1991 | Strubbe et al. | 358/335 |

Primary Examiner—Tommy P. Chin
Assistant Examiner—Huy Nguyen
Attorney, Agent, or Firm—Fish & Richardson

[57] ABSTRACT

A method of automatically reserve-recording and reserve-playing back a broadcasting program comprising the steps of: rewinding a video tape to a reserve-recording start position after completing a reserve-recording mode; and playing back the reserve-recorded broadcasting program when the current time reaches the set reserve-playback start time wherein a user can reserve-record a desired broadcasting program and automatically watch it at the desired time.

4 Claims, 4 Drawing Sheets

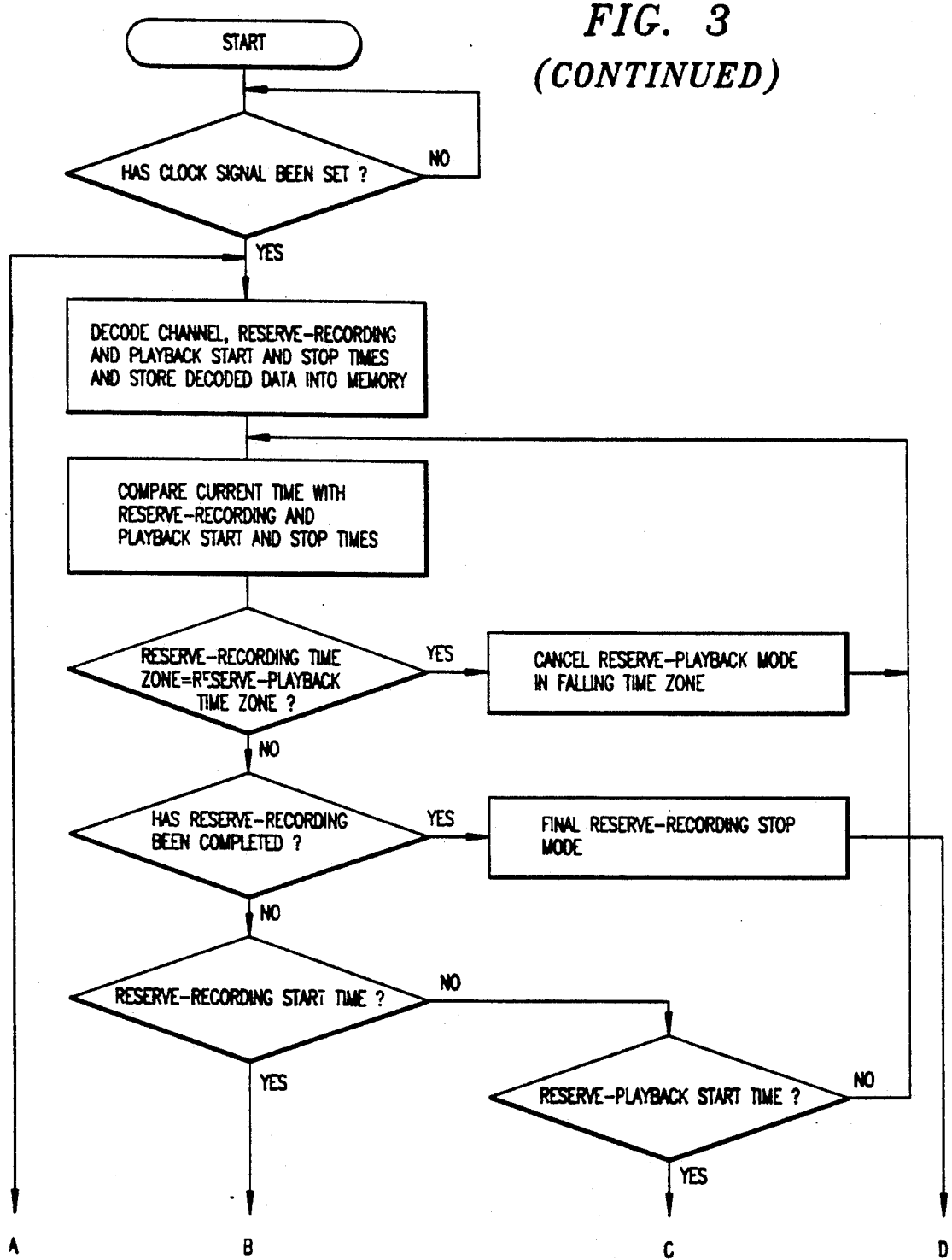

AUTOMATICALLY RESERVE-RECORDING AND RESERVE-PLAYING BACK A BROADCASTED PROGRAM

BACKGROUND OF THE INVENTION

1. Field of Invention

The present invention relates in general to a method of automatically reserve-recording and reserve-playing back a broadcasted program, and, more particularly, to recording broadcasted programs such as news, education and language programs from a television or a radio broadcast at a particular time and automatically playing back the recorded programs at the time specified by a user.

2. Description of the Prior Art

Conventionally, there have been known various VCR (Video Cassette Recorders) and audio systems having a reserve-recording function for reserve-recording, i.e., telerecording and transcribing a broadcasted program at a particular time. However, the conventional VCRs and audio systems didn't have any functions for automatically playing back the recorded program at the time required by a user to allow him to watch and listen to the recorded program.

FIG. 1 is a flow-chart illustrating a conventional method of reserve-recording a broadcasted program. As shown in the drawing, in order to reserve-record a broadcasted program on a particular channel and at the particular time required by a user, first it is checked whether a clock signal for setting the current time has been set. If the clock signal has been set, inputted data is decoded so that contents of the broadcasted program to be reserve-recorded, or the channel and time to be reserve-recorded can be stored. If the clock has not been set, the operation returns to an initial state. After contents of the broadcasted program to be reserve-recorded have been stored, the current time is compared with the reserve-recording start time, and if the current time is the reserve-recording start time, a reserve-recording mode is performed. Thereafter, the current time is compared with the reserve-recording stop time to determine if the current time is the reserve-recording stop time. If the current time is the reserve-recording stop time, a stop mode is executed; if not, the operation returns to the reserve-recording mode. Then, it is checked whether another broadcasted program to be reserve-recorded is present. If another broadcasting program to be reserve recorded is present, for repeated performance of the above-mentioned procedure the operation returns to the step of checking if the current time is accord with the reserve-recording start time as mentioned above; if not, the whole reserve-recording procedure is completed.

Because the conventional method comprised only the reserve-recording function as hereinbefore described, when the user would like to watch or listen to the reserve-recorded, or telerecorded and transcribed broadcasting program, he had no choice but to operate the system by hand to play back the recorded contents.

SUMMARY OF THE INVENTION

It is an object of the present invention to provide a method of automatically reserve-recording and reserve-playing back a broadcasted program which is capable of automatically playing back the reserve-recorded broadcasted program at a time specified by a user.

In accordance with the present invention, the object is be accomplished by providing a method of automatically reserve-recording and reserve-playing back a broadcasted program comprising the steps of: (a) setting the current time and storing the inputted reserve-recording and reserve-playback times respectively; (b) comparing the current time with said inputted reserved-recording and reserve-playback times and reserve-recording a desired broadcasted program during said reserve-recording time only when said reserve-recording time zone does not fall on said reserve-playback time zone; (c) performing a playback mode for playing back said reserve-recorded broadcasted program during said reserve-playback time when the current time is accord with said stored reserve-playback time and checking if another reserve-recording and reserve-playback times inputted are present when the current time is not accord with said stored reserve-playback time; (d) performing repeatedly said steps (a) to (c) when other reserve-recording and reserve-playback times inputted are present and completing the whole procedure just after performing said playback mode at said step (c) when other reserve-recording and reserve-playback times inputted are not present; (e) again checking if another reserve-recording time inputted is present after completing said reserve-playback mode at said step (c), performing repeatedly said steps (a) to (c) when another reserve-recording time inputted is present, and checking if another reserve-playback time inputted is present when another reserve-recording time inputted is not present; and(f) completing said whole procedure after performing said playback mode when another reserve-playback time inputted is present and completing said whole procedure just when another reserve-playback time inputted is not present.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

First, a construction of a generic VCR system for performing a method of automatically reserve-recording and reserve-playing back a TV broadcasted program in accordance with the present invention will be described with reference to FIG. 2.

Figure 1:
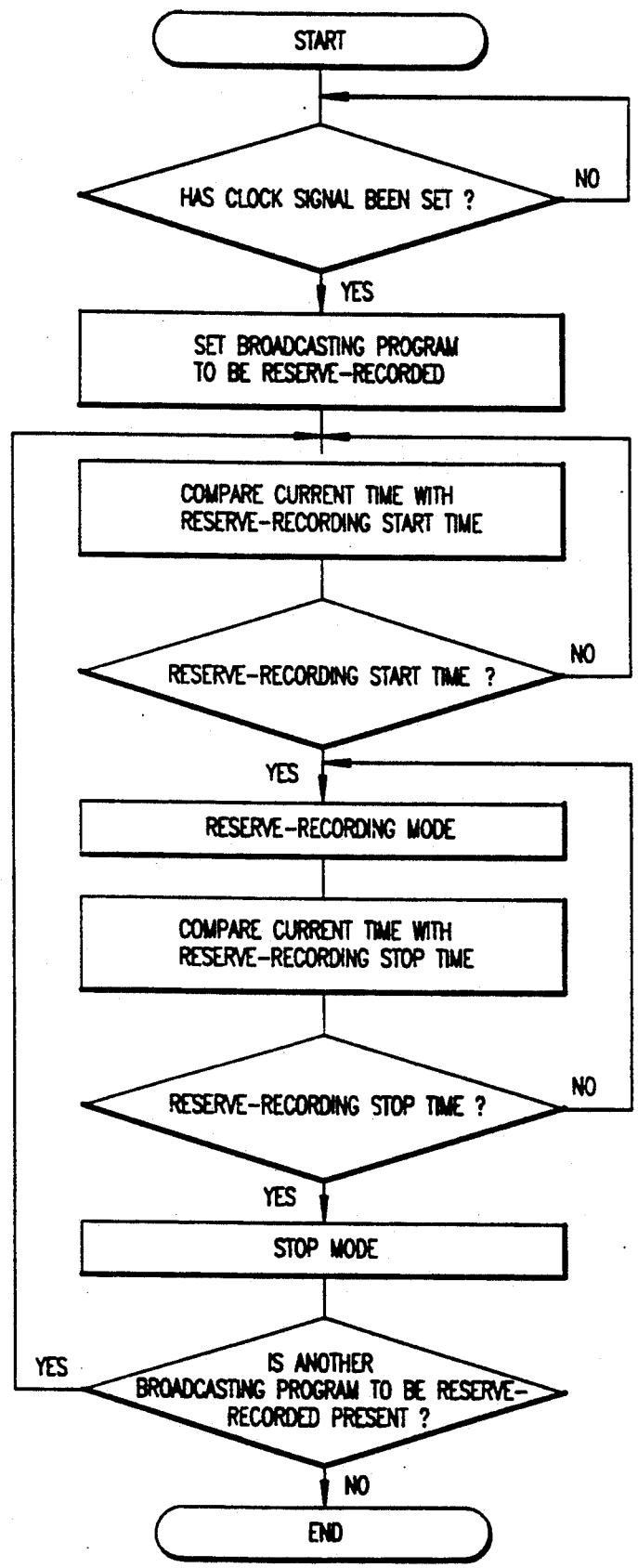
FIG. 1 is a flow-chart illustrating a conventional method of reserve-recording a broadcasting program.
Figure 2:
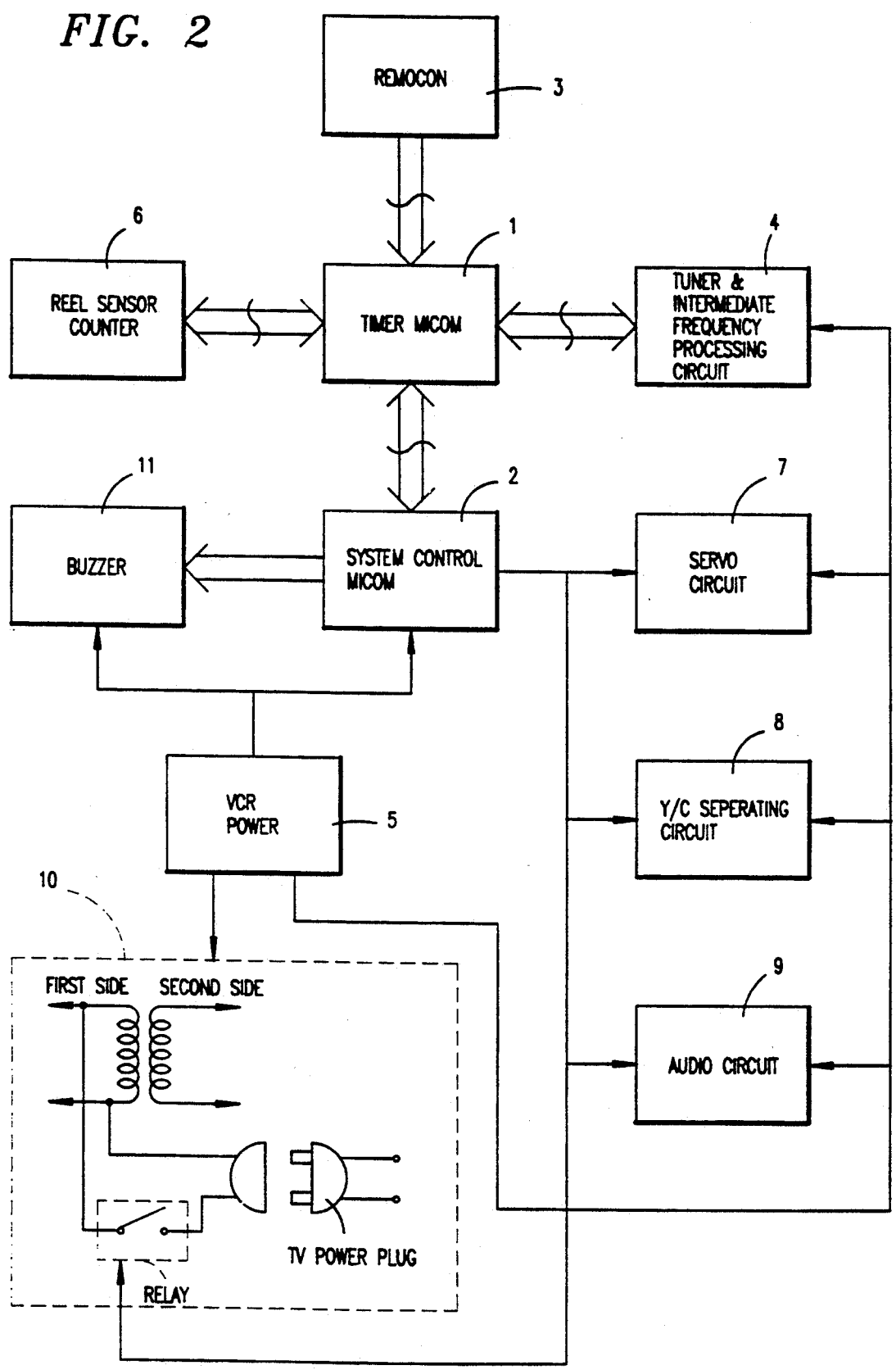
FIG. 2 is block diagram illustrating a a system for automatically reserve-recording and reserve-playing back a broadcasted program in accordance with an embodiment of the present invention.

In FIG. 2, the VCR system is shown to comprise a timer microprocessor 1, a system control microprocessor 2, a remocon or keyboard 3 for outputting channel data, reserve-recording start and stop time data and reserve-playback start and stop time data of a desired TV broadcasted program to the timer microprocessor 1, a tuner and intermediate, frequency processing circuit 4 for tuning a TV broadcasted signal inputted therein and processing an intermediate frequency of the tuned signal, a VCR power supply 5 for supplying power necessary to each component of the VCR system, a real sensor counter 6 for up counting and down counting during performance of each function mode and outputting a predetermined signal in accordance with the counted result to provide data necessary to a system control, a servo circuit 7 for being driven in response to a control signal from the system control microprocessor 2, a luminance signal and chromaticity signal dividing circuit 8, an audio circuit 9, a TV power supply 10 connected to the VCR power supply 5, for being turned on together with the VCR power supply 5 in a reserve-playback mode in response to a control signal from the system control microprocessor 2, and a buzzer 11 for giving the alarm in response to a control signal from the system control microprocessor 2 if the reserve-playback mode starts.

Figure 3:
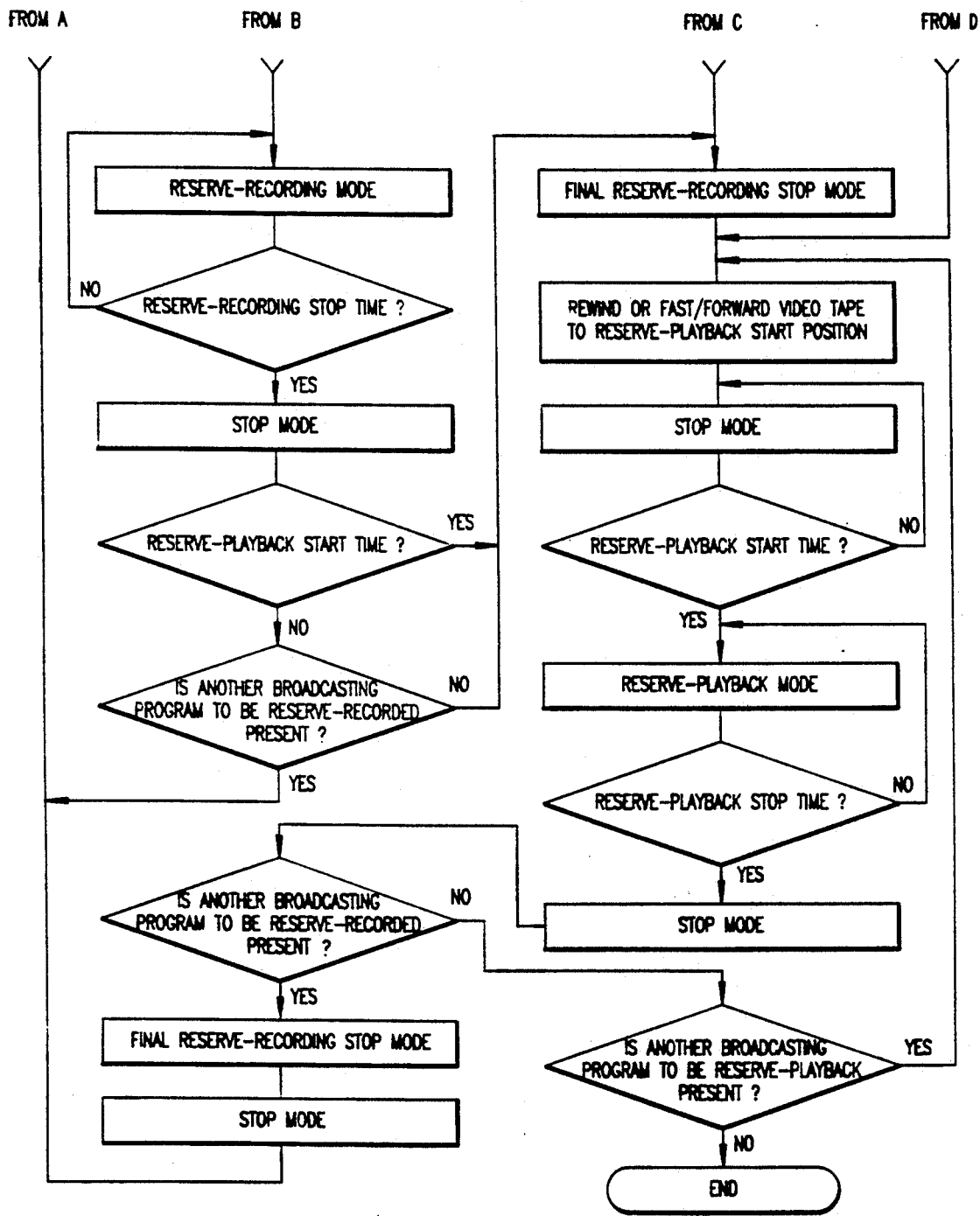
FIG. 3 is a flow-chart illustrating a method of automatically reserve-recording and reserve-playing back a broadcasted program in accordance with an embodiment of the present invention.

Next, the method of automatically reserve-recording and reserve-playing back the broadcasted program in accordance with the present invention by employing the above-mentioned construction will be described in detail with reference to a flow-chart of FIG. 3.

First, if the user operates the remocon or keyboard 3 to output the current time data and then channel data, reserve-recording start and stop time data and reserve-playback start and stop time data of a broadcasted program to be reserve-recorded and reserve-played back to the timer microprocessor 1, the timer microprocessor 1 decodes the inputted data and stores the decoded data into a predetermined memory (not shown). At this time, upon receiving no clock signal for setting the current time, the timer microprocessor 1 returns to an initial state to wait for.

With the lapse of time, the timer microprocessor 1 compares the current time with reserve-recording start and stop times and reserve-playback start and stop times. The timer microprocessor 1 also checks if the reserve-recording time zone falls on the reserve-playback time zone. If so, the reserve-playback mode in the falling time zone is canceled and, thus only reserve-recording mode is performed. That is, priority is given to the reserve-recording mode over the reserve-playback mode.

It is then checked whether the reserve-recording of the desired broadcasted program has been completed. Unless the reserve-recording of the desired broadcasted program has completed, it is checked if the current time is accord with the reserve-recording start time. If the reserve-recording of the desired broadcasted program has been completed, a stop mode is performed and then the reserve-playback mode is performed.

During recording, the time microprocessor 1 in FIG. 2 continually checks whether the current time is the set reserve-recording stop time. If so, the timer microprocessor 1 operates such that the reel sensor counter 6 can be stopped and allows the system control microprocessor 2 to stop the movement of the video tape. Then, values counted by the reel sensor counter 6 at points of the reserve-recording start and stop times are stored in the predetermined memory and the reel sensor counter 6 then operates to down count so that the video tape can be rewound or fast-forward to a reserve-recording start position where the counter value reaches the value at the point of the reserve-recording started time.

When the video tape has been rewound to the reserve-recording start position, the stop mode is performed and then it is checked if the current time is the reserve-playback start time. Unless the current time is the reserve-playback start time, the operation stays at the stop mode to wait for next step; if the current time is the reserve-playback start time, the reserve-playback mode is performed and it is then checked whether the current time is the reserve-playback stop time. Unless the current time is the reserve-playback stop time, the reserve-playback mode is continually performed; if the current time is the reserve-playback stop time, the stop mode is performed and it is then checked whether another broadcasted program to be reserve-recorded is present.

If another broadcasted program to be reserve-recorded is present, the operation returns to the step of rewinding the video tape to the reserve-recording start position, then performing the stop mode, decoding the reserve-recording start and stop time data and reserve-playback start and stop time data of the broadcasted program storing the decoded data into the predetermined memory.

If another broadcasted program to be reserve-recorded present, it is checked whether another broadcasted program to be reserve-played back is present. If another broadcasted program to be reserve-played back is present, the operation returns to the step of rewinding or fast-forward the video tape to the reserve-playback start position; if not, the whole procedure is completed.

On the other hand, at the step of checking if reserve-recording of the broadcasting program has been completed, unless the reserve-recording of the broadcasting program has been completed, it is checked whether the current time is the reserve-recording start time.

Unless the current time is the reserve-recording start time, it is checked if the current time is the reserve-playback start time. If the current time is not the reserve-playback start time, the operation returns to the step of comparing the current time with reserve-recording start and stop times and reserve-playback start and stop times; if the current time is the reserve-playback start time, the point of the reserve-recording stop time is stored in the predetermined memory and then the video tape is rewound or fast/forwarded to a reserve-playback start position.

Thereafter, the stop mode is performed and it is checked if the current time is the reserve-playback start time. If the current time is the reserve-playback start time, the reserve-playback mode is performed. Then, the stop mode is performed and the operation proceeds to the step of checking whether another broadcasted program to be reserve-recorded is present.

On the other hand, at the step of checking if the reserve-recording of the broadcasted program has been completed, unless the reserve-recording of the broadcasted program has been completed and at the step of checking if the current time is the reserve-recording start time, if the current time is the reserve-recording start time, the system performs the reserve-recording mode.

The time microprocessor 1 then checks whether the current time is the reserve-recording stop time. Unless the current time is the reserve-recording stop time, the reserve-recording mode is continually performed and if the current time reaches the reserve-recording stop time, the stop mode is performed.

It is then checked if the current time is the reserve-playback start time. If the current time is the reserve-playback start time, the operation proceeds to the step of storing the point of the reserve-recording stop time into the predetermined memory and the reserve-playback mode is then performed; if not so, it is checked whether another broadcasting program to be reserve-recorded is present.

If another broadcasted program to be reserve-recorded is present, the operation returns to the step of decoding the reserve-recording start and stop time data and reserve-playback start and stop time data of the broadcasted program and storing the decoded data into the predetermined memory; if not so, the operation proceeds to the step of storing the point of the reserve-recording stop time into the predetermined memory.

On the other hand, at the step of checking whether the current time is the reserve-playback start time, if the current time is the reserve-playback start time, the system control microprocessor 2 outputs a drive signal to the buzzer 11 for giving the alarm, in order to indicate the user that the current time reaches the reserve-playback start time of the reserved-recorded, desired broadcasting program.

Also, as shown in FIG. 2, because the TV power supply 10 is connected to the VCR power supply 5, if the current time is accord with the reserve-playback time, the system control microprocessor 2 operates to turn on the VCR and at the same time outputs a control signal to a relay in the TV power supply 10 to turn on the TV. In this way, the user can recognize that the current time has reached the reserve-playback start time of the reserved-recorded, desired broadcasted program, although he is watching the TV. Therefore, the user can automatically watch the reserved-recorded, desired broadcasted program.

The functions of the reel sensor counter 6 in FIG. 2 are to up count in response to a control signal from the timer microprocessor 1 when the VTR operates to initiate the reserve-recording of the broadcasted program as the current time reaches the reserve-recording start time of the broadcasted program and to down count up to the counted value at the point of the reserve-recording start time when the VCR operates to stop the reserve-recording of the broadcasted program as the current time reaches the reserve-recording stop time of the broadcasting program.

The timer microprocessor 1 stores into the predetermined memory values counted by the reel sensor counter 6 at the points of the reserve-recording start and stop times, thereby allowing the system to rewind the video tape to reserve-playback start position in the subsequent reserve-playback mode and then perform the stop mode at the point of the reserve-playback stop time, depending on the stored values.

As hereinbefore described, the method in accordance with the present invention can provide advantages as follows:

First, the user can automatically watch the reserve-recorded broadcasted program at the desired time. For example, a worker can reserve-record a desired broadcasted program and automatically watch it at the time set after leaving his office.

Second, because of automatic performance of the playback mode although the user can play back a desired broadcasting program by his hand, it is convenient for the reserve-recording of a multiplicity of broadcasting programs. More particularly giving an alarm at the same time as entrance into the reserve-playback mode allows the user to recognize obviously their reserve-playback start and stop times.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

I claim:

1. A method of automatically reserve-recording and reserve-playing back a broadcasted program, said method comprising the steps of:
   determining a current time;
   inputting recording start and stop times and playback start and stop times from a user prior to reserve-recording;
   repeatedly comparing the current time with the recording start and stop times and recording the broadcasted program on a recording medium while the current time is within a recording time zone defined between the recording start and stop times; and
   repeatedly comparing the current time with the playback start and stop times and automatically rewinding the recording medium and playing back the recorded broadcasted program while the current time is within a playback time zone defined between the playback start and stop times and is not within the recording time zone.

2. A method as claimed in claim 1, further comprising the step of issuing an alarm signal for a predetermined time when the recording start time is reached.

3. A method of automatically reserve-recording and reserve-playing back broadcasted programs, said method comprising the steps of:
   determining a current time;
   inputting a plurality of sets of recording start and stop times and a plurality of sets of playback start and stop times from a user prior to reserve-recording;
   repeatedly comparing the current time with the recording start and stop times and recording a broadcasted program on a recording medium while the current time is within a recording time zone defined between the recording start and stop times of one of said plurality of sets of recording time; and
   repeatedly comparing the current time with the playback start and stop times and automatically rewinding the recording medium and playing back a corresponding recorded broadcasted program while the current time is within a playback time zone defined between the playback start and stop times of one of said plurality of sets of playback times and is not within the recording time zone of any of said plurality of sets of recording times.

4. A method as claimed in claim 3, further comprising the step of issuing an alarm signal for a predetermined time when a recording start time is reached.

* * * * *